United States Patent [19]
Wyler et al.

[11] Patent Number: 5,270,693
[45] Date of Patent: Dec. 14, 1993

[54] ENLARGED AREA ADDRESSABLE MATRIX

[75] Inventors: John S. Wyler, Berwyn, Pa.;
Frederick E. Hankins, Jr., deceased,
late of Flemington, N.J., by Mary M.
Hankins, executrix

[73] Assignee: Smiths Industries, Inc., Clearwater, Fla.

[21] Appl. No.: 747,087

[22] Filed: Aug. 19, 1991

[51] Int. Cl.⁵ .................................. G09G 3/00
[52] U.S. Cl. .................................. 345/206; 345/87
[58] Field of Search ............... 340/718, 719, 753, 754; 368/242; 359/54, 83, 88

[56] References Cited

U.S. PATENT DOCUMENTS

| | | | |
|---|---|---|---|
| 4,364,672 | 12/1982 | Shibuya et al. | 368/242 |
| 4,435,046 | 3/1984 | Nishimura | 350/334 |
| 4,518,959 | 5/1985 | Ueda et al. | 340/754 |
| 4,544,238 | 10/1985 | Nickol | 359/88 |
| 4,624,529 | 11/1986 | Dorfman | 359/88 |
| 4,655,551 | 4/1987 | Washizuka | 350/334 |
| 4,688,896 | 8/1987 | Castleberry | 350/333 |
| 4,814,757 | 3/1989 | Patterson et al. | 340/753 |
| 4,836,651 | 6/1989 | Anderson | 350/334 |
| 5,008,870 | 4/1991 | Vessa | 368/242 |
| 5,028,916 | 7/1991 | Ichikawa et al. | 340/719 |

Primary Examiner—Alvin E. Oberley
Assistant Examiner—Gin Goon
Attorney, Agent, or Firm—Pennie & Edmonds

[57] ABSTRACT

An enlarged area addressable matrix is disclosed comprising the following major components: a matrix addressable circular display, a square mounting plane, display drivers, and routing between the display and the display drivers. The display is located on the square mounting plane so that four corner regions are formed where the display does not cover the square. These four corner regions are used to accommodate the wiring and driver circuits needed to control the display. Thus the display, display drivers, and routing all fit on the same mounting plane.

24 Claims, 3 Drawing Sheets

ENLARGED AREA ADDRESSABLE MATRIX

CROSS-REFERENCE TO RELATED APPLICATION

This application is copending with application Ser. No. 07/746,825 of John S. Wyler for IMPROVED LIGHTING TECHNIQUE FOR COLOR DISPLAYS filed concurrently herewith, which is hereby incorporated by reference.

FIELD OF THE INVENTION

This invention relates to the field of matrix addressable displays and receivers.

BACKGROUND OF THE INVENTION

The use of matrix addressable displays of a variety of shapes and sizes is well known. In particular, matrix addressable displays of liquid crystal display (LCD) technology are finding a wide range of application from instrumentation dials to general purpose data and video displays.

Relative to electro-mechanical displays, matrix addressable displays are simpler and more durable because they have no moving parts and they are far more versatile since the same display can be varied to depict all manner of different data. Relative to cathode ray tube (CRT) technology, matrix addressable displays are also simpler and more durable and far less bulky. In one respect, however, CRT technology is regarded as holding an advantage because it requires far fewer wires for its control. In particular, CRT's only require the control of a single electron beam regardless of the number of pixels (picture elements) which are to be displayed.

Matrix addressable displays, however, require a number of wires for their control which is at least two times the square root of the number of pixels in the display. As the number of pixels in matrix addressable displays has become large, for example, pixel numbers of two hundred and fifty thousand or more are easily realizable in current LCD technology, the connection of the control wires to a matrix addressable display has become a major engineering problem. Continuing advances in integration technology are almost certain to lead to the need to wire displays of even greater pixel counts.

It is well known that connections which can be done monolithically, on a single plane, are more reliable and simpler to manufacture. However, in the case of display devices there is often the conflicting goal of mounting the display such that any inactive border is minimized. In the case where the matrix addressable display is to be retrofitted in the form factor of older electro-mechanical or CRT displays, this problem is especially acute because these earlier displays tend to fill the surface available to them and the user generally will not accept any display whose size must be reduced to accommodate wiring requirements.

For example, in the field of aircraft instruments this connection border can account for 0.25 inch of the radius available for a conventional circular LCD display. In the older electro-mechanical displays only 0.05 inch of the available display radius was unused. Examples of the prior art for aircraft instruments is shown in FIGS. 1a and 1b. FIG. 1a shows the actual size dial of an electro-mechanical Vertical Speed Indicator (VSI) known as a "2074 Series TCAS II." FIG. 1b shows the actual size dial of an LCD VSI known as a "2874 Series Flat Panel TCAS II."

The loss of 0.25 inch of display radius has a substantial effect on dial size as shown by the following example. If a typical aircraft gauge has a maximum display radius of 1.925 inch, then the maximum dial area (with pi=3.14) is 11.64 square inches. Current electro-mechanical technology decreases the display radius to 1.875 and decreases the dial area to 11.04 square inches. Thus 5% of the maximum display area is unused with electro-mechanical instruments. Current LCD technology decreases the display radius to 1.675 inches, decreasing dial area to 8.81 square inches. Thus 24% of the maximum display area is unused with current LCD instruments. Another way of summarizing the above data is that current LCD aircraft instruments could have dials which are 32% larger if the wiring problems could be solved.

Similar disadvantages are encountered in efforts to wire other types of matrix addressable displays or receivers.

Prior art attempts to satisfy reliability and simplicity while achieving a minimal border have been far from optimal. Typical examples are U.S. Pat. No. 4,688,896 (the '896 patent) and U.S. Pat. No. 4,836,651 (the '651 patent). In the '896 patent the row and column address lines are interdigitated (one half extending to one edge of the display and the other half to the opposite edge) so that the row and column lines can be driven from all four edges of the display. In the '651 patent the row and column lines are brought to pads on the edge of the display's mounting plane. Flex connectors are soldered to the pads and the connectors are bent perpendicularly to the plane of the display to achieve a narrow display border.

The '651 apparatus for a narrow display border is inherently unreliable and difficult to manufacture. In a typical LCD display there will be several hundred of these solder pad connections on each side of the display with a density of approximately 100 pads per inch.

This approach is inadequate when the display is subject to a great deal of mechanical stress in the environment in which it is used.

SUMMARY OF THE INVENTION

The present invention provides a matrix addressable display or receiver that has the reliability and simplicity of manufacture which monolithic construction provides while using virtually all of the area available for a circular display or receiver. In addition, the invention is inherently scalable and will provide an effective solution even for future displays or receivers which may be larger in area, have far smaller pixels, and have far larger pixel counts.

A preferred embodiment of the present invention comprises the following major components: a matrix addressable circular display, a square mounting plane, display drivers, and routing between the display and the display drivers. The display is located on the square mounting plane such that four corner regions are formed where the display does not cover the square. In accordance with the invention, these four corner regions are used to provide the wiring and driver circuits needed to control the display. In particular, the corner regions provide sufficient space, given current integrated circuit technology, for accommodating the display driver circuitry. Furthermore, the corner regions are of a shape which provides routing access between the display drivers and every control line of the display. Thus the display, display drivers, and routing all fit on the same mounting plane.

Scalability is achieved as follows. As the display size increases, the corner regions become proportionately larger to allow sufficient room for the display drivers and routing. As pixel size becomes smaller the routing pitch need only be proportionately reduced.

BRIEF DESCRIPTION OF THE DRAWINGS

These and other objects, features and advantages of the invention will be more readily apparent from the following detailed description of a preferred embodiment of the invention in which.

DETAILED DESCRIPTION OF THE PREFERRED EMBODIMENTS

Figure 1A:
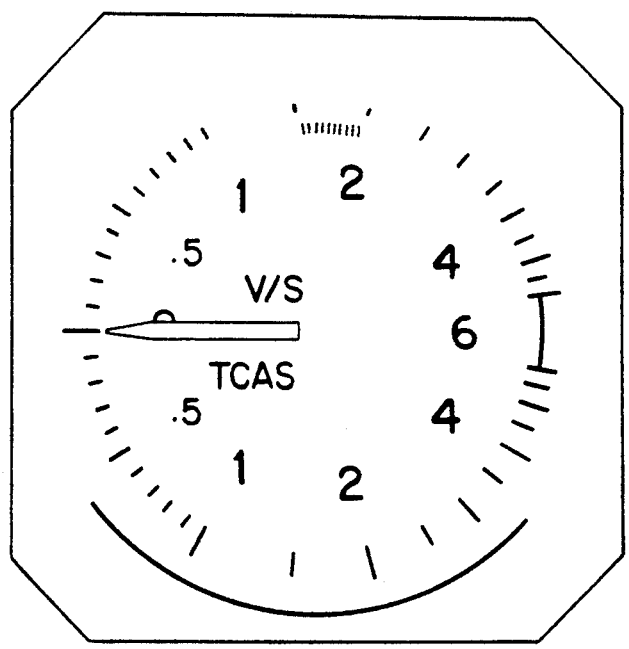
FIG. 1a depicts a prior art electro-mechanical aircraft gauge and in particular shows in actual size the indicator dial for a vertical speed indicator (VSI) known as a "2074 Series TCAS II"
Figure 1B:
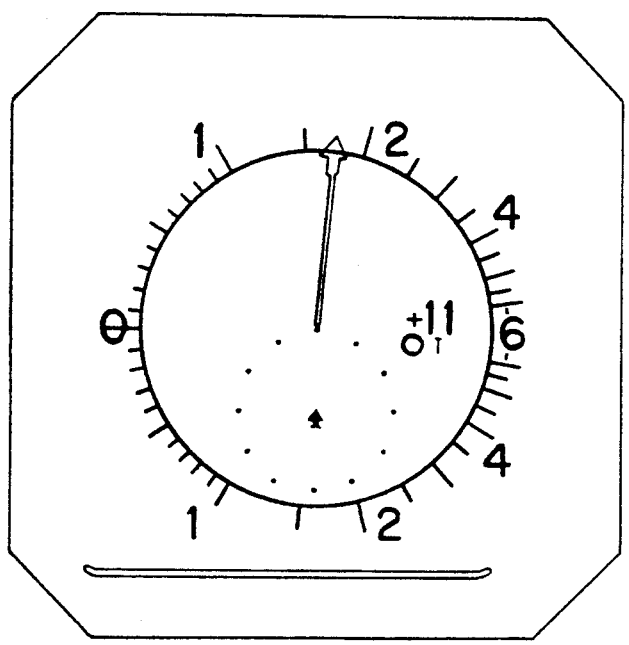
FIG. 1b depicts a prior art LCD aircraft gauge and in particular shows in actual size the indicator dial for a VSI known as a "2874 Series Flat Panel TCAS II"
Figure 2:
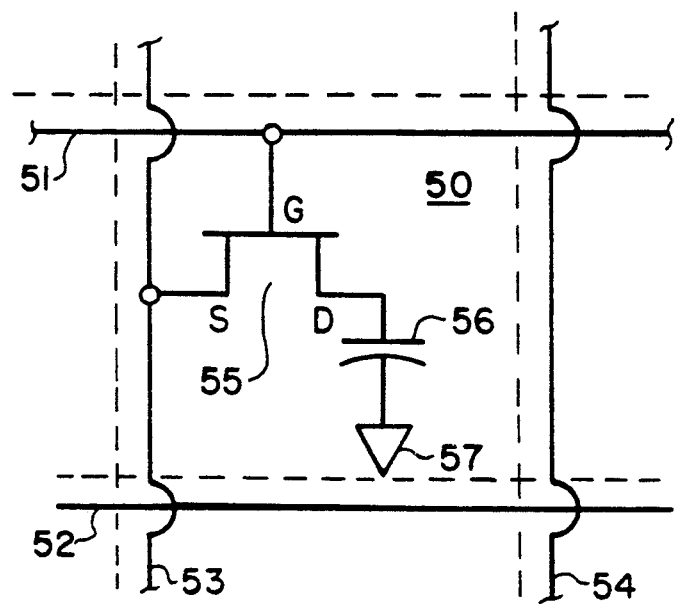
FIG. 2 is a schematic diagram depicting the circuitry for a single cell of a matrix addressable display such as an LCD.

FIG. 2 shows a schematic diagram of a typical LCD display cell 50 for use in a matrix addressable display. The cell includes an LCD element 56, a ground plane 57, a transistor 55, row lines 51, 52 and column lines 53, 54. LCD element 56 is a passive transmitter of light generated from an independent light source (not shown). The transmission of light through LCD element 56 depends upon whether transistor 55 has placed a charge on element 56. Ground plane 57 is the reference with respect to which each LCD display element is charged. Each row line 51 is also called a scan line since its function is to turn on the gates of all LCD cells in a row of the display. Each column line 53 is also called a data line since, if 51 allows, it places or removes a charge on element 56. In the conventional physical realization of the device of FIG. 2, a large number of parallel scan lines and orthogonal parallel data lines are disposed in a planar array with a transistor 55 and an LCD element 56 in the area between each intersecting pair of scan lines and pair of data lines.

Transistor 55 of FIG. 2 advantageously comprises a field effect transistor (FET), preferably of the amorphous silicon type. Alternatively, other types of switches such as polysilicon gates or other semiconductive materials such as cadmium selenide may be used. FET 55 includes a gate electrode G connected to scan line 51, a source electrode S connected to data line 53, and a drain electrode D connected to LCD element 56. As will be appreciated by those skilled in the art, LCD element 56 is electrically connected via FET 55 to data line 53 whenever gate G of FET 55 is provided via scan line 51 with an appropriate electrical gating signal to render FET 55 conductive between its source S and drain D electrodes. While only a single FET 55 has been illustrated within LCD display cell 50, an additional FET or FETs may be included in cell 50 to provide redundancy in the event that one or more of the FETs is defective.

Figure 5:
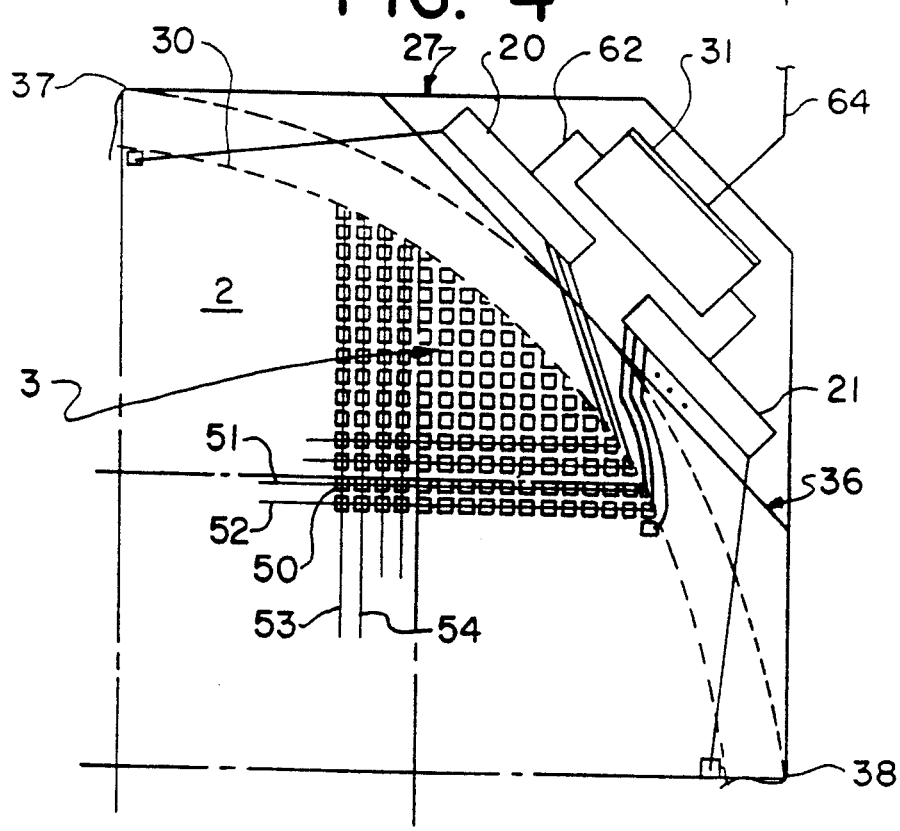
FIG. 5 is an enlarged view of the upper right hand corner of FIG. 3 and also shows the preferred routing of row display drivers to the display.

Scan lines 51 and 52 and data lines 53 and 54 of FIG. 2 (and FIG. 5) form part of the display's matrix and as shown in FIG. 5, each scan line is connected to its driver on either the left or right side of the matrix, and each data line is connected to its driver on either the top or bottom of the matrix. In the present invention and in conventional matrix addressable displays, tens or hundreds of thousands of identical cells 50 are arranged in rectilinear arrays and used to generate a display by selective activation of the individual cells under control of numerous scan and data lines.

The invention is not limited to liquid crystal displays. Alternatives to LCD element 56 comprise other passive transmitters of light, such as electrochromatic or electrophoretic material. Other alternatives to LCD element 56 comprise active generators of light; such as a light emitting diode or other electroluminescent material. A further alternative comprises an electrically-responsive sensor of light, such as an X-ray scintillator. Another alternative is an element that converts electrical information to mechanical information, or vice-versa, such as a piezoelectric element. A still further alternative is an element, to be used in a receiver matrix, which generates an electrical signal in response to light, such as a photodiode.

Techniques are well known for the formation of matrix addressable displays and receivers of all types. For example, as disclosed in FIGS. 2 and 3 of the cross-referenced copending application Ser. No. 07/746,825 of John S. Wyler, the physical structure of a typical liquid crystal display comprises a layer of a liquid crystal material, a polarizer and an analyzer on opposite sides of the liquid crystal material and transparent sheets enclosing the liquid crystal material. A continuous transparent ground plane electrode is located on a first of the transparent sheets between the sheet and the liquid crystal material, and an array of discrete transparent electrodes is located on a second of the transparent sheets between the sheet and the liquid crystal material. The row lines, column lines and transistors of the matrix addressing system are located on the second transparent sheet as well. Advantageously, the ground plane electrode, the discrete electrodes, the row lines, the column lines and the transistors are all formed on their respective sheets by known techniques. A sandwich-like structure is then formed with a layer of liquid crystal material between the two transparent sheets and this structure is sealed at its periphery. The polarizer and analyzer are located in this sandwich either between the liquid crystal material and the transparent sheets or on the outside of a sheet as shown in the cross-referenced application. In addition, where a color display is desired, color phosphors or color filters may be used as is also disclosed in the cross-referenced application.

Figure 3:
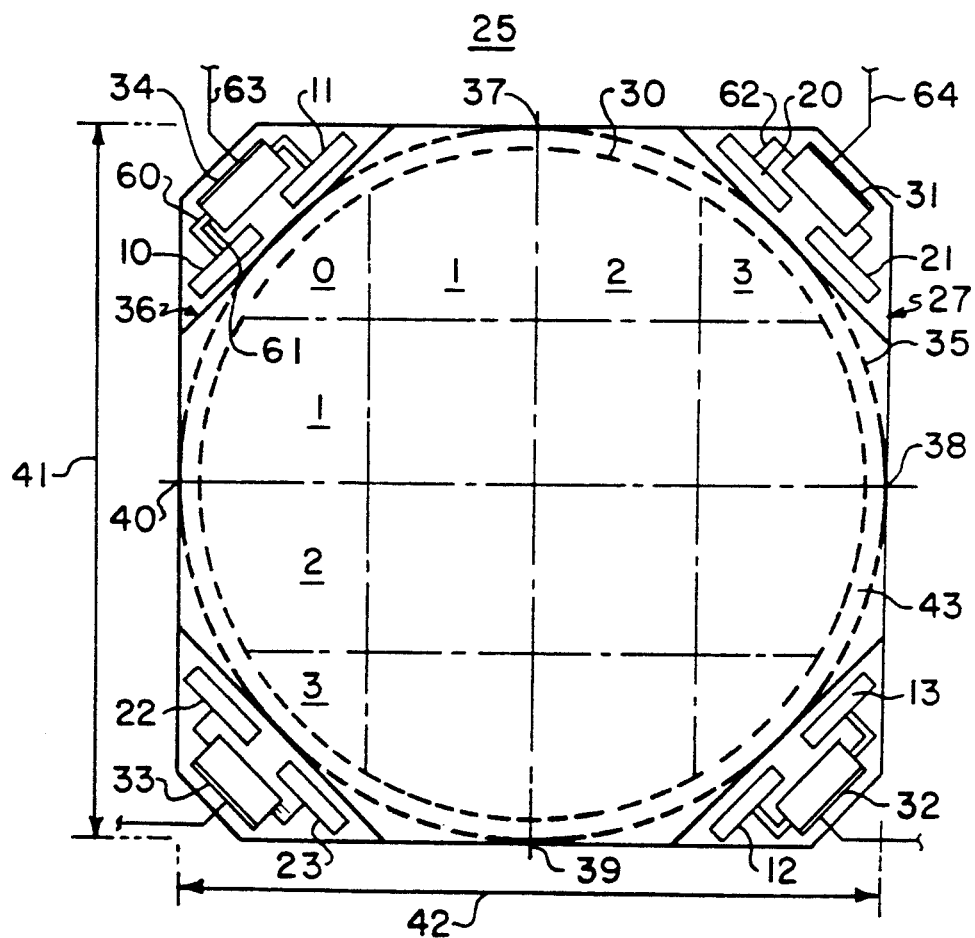
FIG. 3 depicts a preferred embodiment of the display of the present invention.

FIG. 3 depicts a preferred embodiment of a matrix addressable display device 25 formed in accordance with the invention on a mounting plane 27 such as a glass sheet. Illustratively, the side of mounting plane 27 that is not visible in FIG. 3 is the exterior surface of the display device. Typical dimensions for mounting plane 27, indicated by lines 41 and 42 in FIG. 3, are 3.85 inches square in the case of aircraft gauges.

Preferably, the display device is an LCD display formed on the mounting plane using conventional technology. Circle 30 of FIG. 3 indicates the outer edge of a rectilinear matrix of addressable cells in the LCD display and therefore the outer limit of the active display area. Illustratively, the cells are the same as those of FIG. 2 and are formed in the same fashion. In particular, the discrete electrodes, the row lines, the column lines and the transistors of the LCD display are all formed by conventional techniques on mounting plane 27. The ground plane electrode is formed on an octagonal glass sheet 36. A sandwich-like structure is then formed by sealing a layer of liquid crystal material between mounting plane 27 and octagonal glass sheet 36 with the electrodes on the inside. In FIG. 3 the seal is represented by the annular region between circle 30 and circle 35.

A typical diameter for circle 30 in LCD technology for aircraft gauges is about 3.54 inch. With present technology this permits a display having about 640 square cells on the horizontal or vertical axis and 640 scan lines and 640 data lines.

The use of an octagonal glass sheet 36 is preferred because it is easy to align this sheet with the mounting plane if the octagonal glass sheet is made so that the distance between opposite sides (37, 39 and 38, 40) of the octagonal sheet is exactly the same as the distance between opposite sides of the mounting plane. However, sheets of other shapes may also be used in the practice of the invention.

The display matrix is driven by the following method. There are two types of driver circuits: row drivers and column drivers. The row drivers are connected to the scan lines, and sequentially assert an electrical level on each scan line such that all the FETs whose gates are connected to that scan line will be in a conductive state. For each scan line asserted by the row drivers, the column drivers will connect a single serial data input sequentially to all the data lines. Given an appropriate synchronization between the order of data given to the serial data input, and the scanning of each LCD display cell, the desired image is written into the LCD matrix 30 and displayed.

Of particular interest for the present invention, the driver circuitry converts time multiplexed serial data into space multiplexed parallel data. Therefore the drivers require only a few wires as input for their control and output orders of magnitude more wires for control of the display matrix. By integrating the driver circuitry into the same mounting plane as the display, the present invention reduces by at least two orders of magnitude the number of wires which must be connected to the mounting plane of the display.

Figure 4:
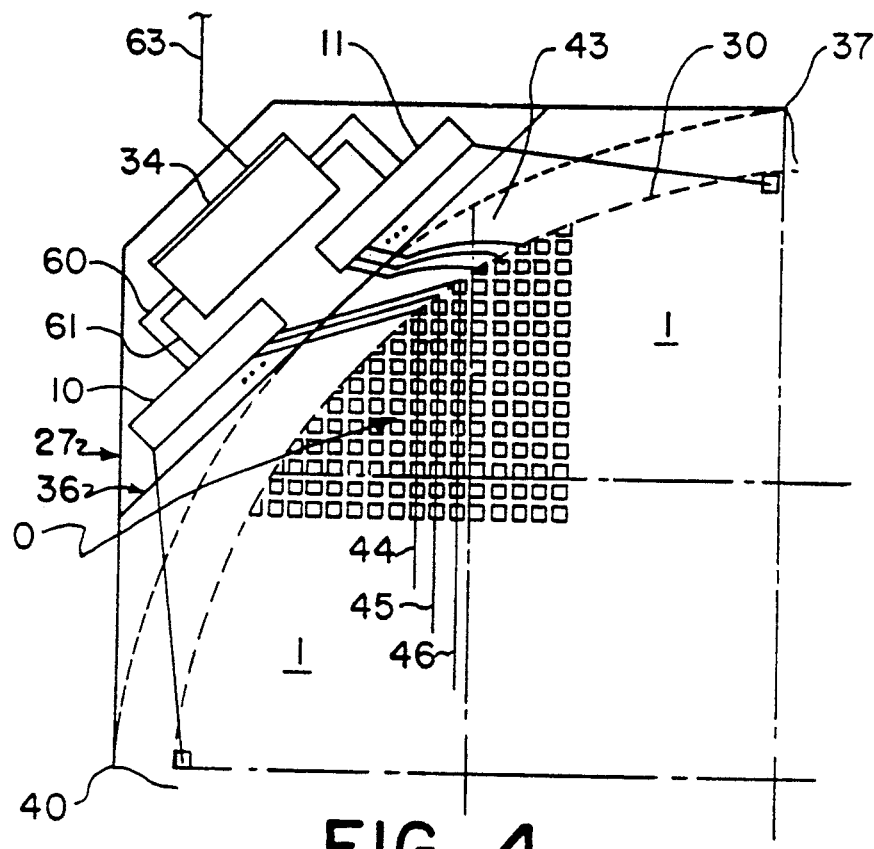
FIG. 4 is an enlarged view of the upper left hand corner of FIG. 3 and also shows the preferred routing of column display drivers to the display.

As shown in FIGS. 3-5 column driver circuits 10, 11, 12, 13 and row driver circuits 20, 21, 22, and 23 are placed on the mounting plane in the four corner regions of mounting plane 27 that are not covered by sheet 36. Advantageously, the driver circuits are formed directly on the glass sheet of mounting plane 27 using conventional integrated circuit fabrication technology. Alternatively, the driver circuits could be discretely fabricated integrated circuit chips. FIGS. 4 and 5, which show respectively the upper left and upper right corners of FIG. 3, depict the circuit routing from the driver circuits to the matrix of LCD cells. Preferably, this circuit routing is formed on the glass surface of the mounting plane 27 again using conventional technology.

FIG. 3 shows display 25 divided into four columns labeled regions 0, 1, 2, 3 from left to right. Each of these column regions is intended to contain an equal number of data lines of the display matrix. Likewise, FIG. 3 also shows display 25 divided into four rows labeled 0, 1, 2, 3 from top to bottom. Each of these row regions is intended to contain an equal number of scan lines.

A preferred placement of the row and column driver circuitry is as follows. Column drivers 10, 11, 12 and 13 are connected, respectively, to the data lines within column regions 0, 1, 2 and 3. Row drivers 20, 21, 22 and 23 are connected, respectively, to the scan lines within row regions 0, 1, 2 and 3. As will be apparent, in this arrangement the four row drivers are located in two pairs in diagonally opposite corners; and the four column drivers are similarly located in two pairs in the other two diagonally opposite corners.

FIG. 4 shows the connection of column drivers 10 and 11 to the data lines of, respectively, column regions 0 and 1. In particular, FIG. 4 shows three exemplary data lines 44, 45 and 46 which are all driven by column driver 10. FIG. 5 shows the connection of row drivers 20 and 21 to the scan lines of, respectively, row regions 0 and 1. In particular, FIG. 5 shows two exemplary scan lines 51 and 52 which are both driven by row driver 21. As can be seen from FIGS. 3, 4 and 5, there is a significant advantage in the particular placement of the row and column driver circuitry herein described: it allows all the routing between the drivers and the display to be accomplished in a single plane. There is never any need for one routing wire to cross over another.

It will be readily apparent, however, that other placements of row and column driver circuitry will allow single plane routing. Another placement for the drivers of FIG. 3 would be as follows: Locate the column drivers where drivers 22, 11, 12 and 21 are shown in FIG. 3 and connect them, respectively, to the data lines within column regions 0, 1, 2 and 3; and locate the row drivers where drivers 20, 10, 13 and 23 are shown in FIG. 3 and connect them, respectively, to the scan lines within row regions 0, 1, 2 and 3.

As described above, a typical LCD display requires 640 scan line connections, 640 data line connections, and 1 ground plane connection for a total of 1281 connections. In the prior art these 1281 connections would be made around the four edges of the mounting plane to wires which are then bent perpendicular to the plane of the display. In the current invention all of these 1281 connections are made to driver circuits on mounting plane 27.

With the present invention, the number of connections which must be made around the four edges of mounting plane 27 is as few as five: two for power and ground; a clock signal to cause the row and column drivers to sequence; a serial data input; and a synchronization signal to synchronize the scan of the display with the serial data input. Numerous other control arrangements can be used.

The control signals for the row and column drivers are as follows. The row drivers require a clock input, a synchronization input, a clock enable, and control signals between the row drivers to cause each row driver to perform its part of the scan at the right time. The column drivers require a clock input, a synchronization input, a serial data input, an output to enable the clock of the row drivers after each complete scan of the columns, and control signals between the column drivers to cause each column driver to perform its part of the scan at the right time. While we have illustrated the scan being fastest across the columns, it is readily apparent that the control structure could be easily changed to achieve the equivalent scan in which rows are scanned fastest.

In the interests of generality, FIG. 3 provides a schematic illustration of the connection of the row and column drivers to connectors 31-34. In particular, drivers 10 and 11 are wired to connector 34, drivers 20 and 21 are wired to connector 31, drivers 12 and 13 are wired to connector 32, and drivers 22 and 23 are wired to connector 33. Connectors 31, 32, 33 and 34 can bring off the mounting plane 27 all wires necessary for completing the display's data and control lines as illustrated by cables 63 and 64 connected to the mounting plane.

FIG. 3 does show two sets of wires between a column driver and its connector, while a row driver only has one set of wires to its connector. For example, column driver 10 has wire sets 60 and 61 to connector 34, while row driver 20 has only wire set 62 connecting it to connector 31. The two sets of wires for column drivers is intended to highlight the fact that a column driver takes a serial data input in addition to a set of control signals. The row drivers have no such data input.

An important feature of the present invention is its scalability. As the number of pixels increases for future displays, the number of connections made to the mounting plane will remain constant. As display size increases, the corner regions remain of the same shape allowing the routing access to all scan and data lines of the display matrix. As display size increases, the corners increase proportionately in area ensuring that the driver circuitry will fit. As pixel size is decreased the routing pitch is also proportionately reduced.

From the foregoing description of the invention, numerous alterations, modifications and improvements will be readily apparent. For example, in keeping with this invention, many other arrangements of driver circuitry and routing are possible. As shown in FIG. 3 the driver circuitry of each corner is divided between two units, preferably two silicon integrated circuits. However, the driver circuitry of each corner could all be within one unit. Depending upon the particular circumstances of usage, it might be desirable to have the driver circuitry of each corner divided between three or more units. While placements of driver circuitry have been shown which require only one plane for routing, the use of multiple routing planes may be desirable under special circumstances.

For example, if in FIG. 3 driver 10 were a row driver of row regions 0 and 1 with driver 11 being a column driver of column regions 0 and 1, then two routing planes would be necessary. If all the driver circuitry and routing were placed in two diagonally opposite corners, then the two other unused corners of the mounting plane could be removed allowing for an even smaller display border.

As will be apparent, the invention may also be practiced using active display (or receiver) areas having shapes different from circles and mounting planes having shapes different from squares. In general, it is only necessary that the active display be smaller in area than the mounting plane on which it is located and that the areas where the display area and the mounting plane do not coincide be large enough to accommodate the row and column drivers of the display. As will also be apparent, the invention may also be practiced using a variety of technologies to form the matrix addressable cells, the driver circuits and the signal lines between the cells and the driver circuits.

Such obvious alterations, modifications and improvements, even if not expressly described herein, are intended to be suggested by this disclosure and within the spirit and scope of the invention.

What is claimed is:

1. A display apparatus comprising:
   a matrix addressable display having row leads and column leads for controlling the display;
   a rectangular mounting plane having four sides: one to the West, one to the East, one to the North and one to the South, the mounting plane being larger in area than the display;
   the display being located within the mounting plane and having a shape and an orientation such that there is a region along each side of the mounting plane where the distance between the display and the side of the mounting plane is minimized and four corner regions of the mounting plane where there is a relatively large distance between the display and the sides of the mounting plane;
   a plurality of row drivers connected by row conductors on the mounting plane to the row leads of the display wherein there is at least one row driver located in at least one of the two corner regions on the North side of the mounting plane and wherein there is at least one row driver located in at least one of the two corner regions on the South side of the mounting plane which is diagonally opposite the at least one corner region of the North side, the row conductors in each corner of the mounting plane being in a single plane; and
   a plurality of column drivers connected by column conductors on the mounting plane to the column leads of the display wherein there is at least one column driver located in at least one of the two corner regions on the East side of the mounting plane and wherein there is at least one column driver located in at least one of the two corner regions one the West side of the mounting plane which is diagonally opposite the at least one corner region of the East side, the column conductors in each corner of the mounting plane being in a single plane thereby the mounting of the row and column drivers on the corner regions allows minimization of the distance between the display and the side of the mounting plane.

2. The apparatus of claim 1 wherein the matrix addressable display is circular.

3. The apparatus of claim 1 wherein the mounting plane is square.

4. The apparatus of claim 1 wherein the matrix addressable display is circular and the mounting plane is square.

5. The apparatus as recited in claim 1 wherein:
   the plurality of row drivers are located in two diagonally opposite corner regions;
   the plurality of column drivers are located in two diagonally opposite corner regions; and
   each of the four corner regions contains either all row drivers or all column drivers.

6. The apparatus as recited in claim 1 wherein the display comprises a liquid crystal display element at each intersection point of the matrix addressable display.

7. The apparatus as recited in claim 1 wherein:

the plurality of row drivers drive the row leads sequentially in response to a synchronization input; and the plurality of column drivers drive the column leads sequentially in response to a synchronization input with a value determined by a data input.

8. A display apparatus comprising:

a matrix addressable display having row leads and column leads for controlling the display;

a rectangular mounting plane having four sides, the mounting plane being larger in area than the display;

the display being located within the mounting plane and having a shape and an orientation such that there is a region along each side of the mounting plane where the distance between the display and the side of the mounting plane is minimized and four corner regions of the mounting plane where there is a relatively large distance between the display and the sides of the mounting plane;

a plurality of row drivers connected by row conductors on the mounting plane to the row leads of the display wherein at least one row driver is located in each of at least two of the corner regions which are diagonally opposite each other, the row conductors in each corner of the mounting plane being in a single plane; and a plurality of column drivers connected by column conductors on the mounting plane to the column leads of the display wherein at least one column driver is located in each of at least two of the corner regions which are diagonally opposite each other, the column conductors in each corner of the mounting plane being in a single plane thereby the mounting of the row and column drivers on the corner regions allows minimization of the distance between the display and the side of the mounting plane.

9. The apparatus of claim 8 wherein the matrix addressable display is circular.

10. The apparatus of claim 8 wherein the mounting plane is square.

11. The apparatus of claim 8 wherein the matrix addressable display is circular and the mounting plane is square.

12. The apparatus as recited in claim 8 wherein:
the plurality of row drivers are located in two diagonally opposite corner regions;
the plurality of column drivers are located in two diagonally opposite corner regions; and
each of the four corner regions contains either all row drivers or all column drivers.

13. The apparatus as recited in claim 8 wherein the display comprises a liquid crystal display element at each intersection point of the matrix addressable display.

14. The apparatus as recited in claim 8 wherein:
the plurality of row drivers drive the row leads sequentially in response to a synchronization input; and
the plurality of column drivers drive the column leads sequentially in response to a synchronization input with a value determined by a data input.

15. A receiver apparatus comprising:
a matrix addressable receiver having row leads and column leads for controlling the receiver;
a rectangular mounting plane having four sides: one to the West, one to the East, one to the North and one to the South, the mounting plane being larger in area than the receiver;

the receiver being located within the mounting plane and having a shape and an orientation such that there is a region along each side of the mounting plane where the distance between the receiver and the side of the mounting plane is minimized and four corner regions of the mounting plane where there is a relatively large distance between the receiver and the sides of the mounting plane;

a plurality of row drivers connected by row conductors on the mounting plane to the row leads of the receiver wherein there is at least one row driver located in at least one of the two corner regions on the North side of the mounting plane and wherein there is at least one row driver located in at least one of the two corner regions on the South side of the mounting plane which is diagonally opposite the at least one corner region of the north side, the row conductors in each corner of the mounting plane being in a single plane; and a plurality of column drivers connected by column conductors on the mounting plane to the column leads of the receiver wherein there is at least one column driver located in at least one of the two corner regions on the East side of the mounting plane and wherein there is at least one column driver located in at least one of the two corner regions on the West side of the mounting plane which is diagonally opposite the at least one corner region of the East side, the column conductors in each corner of the mounting plane being in a single plane thereby the mounting of the row and column drivers on the corner regions allows minimization of the distance between the display and the side of the mounting plane.

16. The apparatus of claim 15 wherein the matrix addressable receiver is circular.

17. The apparatus of claim 15 wherein the mounting plane is square.

18. The apparatus of claim 15 wherein the matrix addressable receiver is circular and the mounting plane is square.

19. The apparatus as recited in claim 15 wherein:
the plurality of row drivers are located in two diagonally opposite corner regions;
the plurality of column drivers are located in two diagonally opposite corner regions; and
each of the four corner regions contains either all row drivers or all column drivers.

20. The apparatus as recited in claim 15 wherein the receiver comprises a photoelectric receptor element at each intersection point of the matrix addressable receiver.

21. The apparatus as recited in claim 15 wherein:
the plurality of row drivers drive the row leads sequentially in response to a synchronization input; and
the plurality of column drivers sample the column leads sequentially in response to a synchronization input for a value generated by a photoelectric receptor element.

22. The display apparatus of claim 12 wherein the conductors from the row drivers and the column drivers in each corner region of the mounting plane to the row leads and the column leads of the display are all in a single plane.

23. The display apparatus of claim 9 wherein the row leads are parallel to each other and the column leads are parallel to each other.

24. The display apparatus of claim 8 further comprising at least one row connector positioned in a corner region of the mounting plane and connected to at least one row driver in said corner region to supply synchronization, control and possibly data signals to the row leads and at least one column connector positioned in a corner region of the mounting plane connected to at least one column driver to supply synchronization, control and possibly data signals to the column leads of the display.

* * * * *